United States Patent [19]
Shirasu

[11] Patent Number: 6,072,760
[45] Date of Patent: Jun. 6, 2000

[54] REPRODUCTION APPARATUS AND METHOD

[75] Inventor: Toshiyuki Shirasu, Kanagawa, Japan

[73] Assignee: Sony Corporation, Tokyo, Japan

[21] Appl. No.: 09/094,246

[22] Filed: Jun. 9, 1998

[30]    Foreign Application Priority Data

Jun. 19, 1997 [JP] Japan ................................. 9-162218

[51] Int. Cl.⁷ .............................. G11B 7/00; G03B 31/00
[52] U.S. Cl. ......................... 369/100; 369/44.23; 352/11
[58] Field of Search ............................ 352/1, 26, 3, 24, 352/36, 27, 37, 11; 369/112, 118, 120, 122, 124, 61, 100, 44.23; 250/552

[56]           References Cited

U.S. PATENT DOCUMENTS

| | | | |
|---|---|---|---|
| 4,085,296 | 4/1978 | Keegan | 369/112 |
| 4,870,633 | 9/1989 | Matsushita et al. | 369/47 |
| 5,471,454 | 11/1995 | Tani | 369/100 |
| 5,473,454 | 12/1995 | Blanchard | 359/69 |
| 5,757,465 | 5/1998 | Seagrave et al. | 352/11 |
| 5,761,349 | 6/1998 | Inatome et al. | 382/312 |

*Primary Examiner*—Alan A. Mathews
*Assistant Examiner*—Rodney Fuller
*Attorney, Agent, or Firm*—Philip M. Shaw, Jr.; Crosby, Heafey, Roach & May

[57]            ABSTRACT

To be capable of obtaining diffuse light with a sufficient amount of light, which is not susceptible to the influence of scratches of a film along the length direction, and to be capable of constructing the apparatus in a small size and at a low cost, a digital audio signal S track or P track is formed on the side of the film furtherest to the left of the left perforations or to the right of right perforations of a movie film, respectively. Light from an LED 51 is diffused by an elliptical diffuser 52, the diffusion angle of which is greater along the width direction of the film than along the length direction thereof, and is radiated onto the P track (or the S track). Then, the transmitted light which has passed through the P track (or the S track) is converged onto a line sensor 43A as a result of passing through a lens 42A, and the light is photoelectrically converted by the line sensor 43A, thereby reproducing digital sound.

16 Claims, 13 Drawing Sheets

REPRODUCTION APPARATUS AND METHOD

BACKGROUND OF INVENTION

1. Field of the Invention

The present invention relates to a reproduction apparatus and method and, more particularly, to a reproduction apparatus and method suitable for use in a case in which, for example, digital sound data and the like recorded on a movie film is reproduced.

2. Description of Related Art

FIG. 8 shows the construction of an example of a conventional movie film. A movie film 1 is, for example, a 35 mm movie film used in movie theaters, with perforations, serving as feed holes used to obtain feeding synchronization, being formed at predetermined intervals on both end portions of the movie film along the width direction. Further, picture frames (commonly called frames) in which an image is optically recorded are formed in the central portion thereof along the width direction. Here, the length of the picture frame along the length direction is, for example, 19.05 mm, and for one picture frame, for example, four perforations are formed on both the right and the left.

Between the picture frames and perforations on the right (right perforations in FIG. 8), analog tracks are provided, an analog sound signal being formed optically therein.

Meanwhile, as CD (Compact Disc) players and other digital audio equipment have become widespread into ordinary households in recent years, there has been an increased demand for digitization of movie sound. Accordingly, recently a technique is becoming popular in which digital sound, in addition to analog sound, is recorded on a movie film, and digital sound is normally used and analog sound is used as a back-up.

Various methods of recording digital sound on a movie film have been proposed. As one of them, there is a SDDS (Sony Dynamic Digital Sound) (trademark) method in which, as shown in FIG. 8, a P track or a S track is provided on the side further to the left of the left perforations or on the side further to the right of the right perforations, and pits in the form of dots are formed therein, thus recording digital sound. In the SDDS method, for example, as shown in FIG. 9, rectangular pits (dots), which are 24 microns along the width direction and 22.5 microns along the length direction, are recorded optically in a manner corresponding to digital sound. The pitch along the length direction is, for example, 26.5 microns.

Reproduction of the P tracks and the S tracks in which digital sound is recorded is performed, for example, along the length direction with a pit sequence formed along the width direction being one unit.

FIG. 10 shows the principle of the reproduction method for reproducing digital sound. For example, light emitted from a light source, for example, an LED (light-emitting diode) 101 or a halogen lamp, is radiated on the P tracks and the S tracks of the movie film 1 via an optical fiber 102. The light radiated onto the P tracks and the S tracks passes therethrough in a manner corresponding to the pits formed therein, and the transmitted light enters a lens 103. The transmitted light from the movie film 1 is converged by the lens 103 onto line sensors 104, such as a line CCD (charge coupled device). In the line sensors 104, the light is photo-electrically converted into an electrical signal corresponding to dots for one line along the width direction. This electrical signal is provided to a decoder 105 whereby it is decoded into digital sound, and is output from a speaker 107 via an amplifier 106.

In the SDDS method, for example, eight-channel sound output is made possible: the screen center (center) in which an image is projected, the right and left thereof (left and right), between the center and the left (left center), between the center and the right (right center), subwoofer, left surround, and right surround.

Further, in the SDDS method, digital sound is coded by a coding method called ATRAC (Adaptive TRansform Acoustic Coding) adopted in mini-discs (trademark), achieving a data compression rate of about ⅕. In the decoder 105, decoding of data which is coded by this ATRAC method, and others is performed.

In the case where the reproduction of the P tracks and the S tracks such as that described above is performed, in order that the reading characteristics are maintained to some degree, it is required that the light-amount distribution in the line sensors 104 be uniformly formed. Here, the formation of a uniform light-amount distribution refers to the output of the line sensors 104 becoming almost uniform as shown in FIG. 11 when it is assumed that the entire movie film 1 is uniformly transparent. Specifically, it means that the ratio of the minimum output to the maximum output (minimum output/maximum output) in a particular line of the line sensors 104 becomes a predetermined standard value or more.

In order to cause the S/N (Signal/Noise) ratio of the line sensors 104 to be a predetermined value or more, the amount of light which reaches each pixel of the line sensors 104 must be nearly constant regardless of the pixel position of the line sensors 104.

Also, the movie film 1 is constructed in such a way that a layer of emulsion is formed on a base, as shown in FIG. 12A, and pits as digital sound are formed by optically discoloring the emulsion. Since the projection thereof is performed by causing the movie film 1 to be fed along the length direction, as shown in FIG. 12B, a number of fine scratches which are extended along the length direction are ordinarily formed on the base. In order to prevent (reduce) an occurrence of pit reading errors due to these scratches, it is required that the light to be radiated onto the movie film 1 be diffuse light.

Conventionally, because of the above, an illumination optical system of a reproduction apparatus which reproduces digital sound is constructed as shown, for example, in the perspective view of FIG. 13.

That is, in order that the amount of light which passes through the film 1, the lens 103, and reaches each pixel regardless of the pixel position in the line sensor 104 is constant, the optical fiber 102 is constructed by using about 10,000 very small fibers having, for example, a diameter of approximately 50 mm, and these are made to branch into bundles of about 2,500 each as very small fibers $102_1$, $102_2$, $102_3$, and $102_4$. Further, the very small fibers $102_1$ to $102_4$ are arrayed, for example, in such a manner as to be twisted so that the positional relationship of both the end surfaces becomes random, thereby causing the light which exits from the optical fiber 102 to be constant.

Further, to make the light to be radiated onto the movie film 1 diffuse light, in addition to an LED $101_1$ which emits light which is parallel to the optical axis of the optical fiber 102, LEDs $101_2$ and $101_3$ which emit light which forms a predetermined angle, other than 0 degrees, with respect to the optical axis of the optical fiber 102 are provided so as to form light (diffuse light) having a high degree of diffusion. In this case, when light is diffused in this manner, as shown in FIGS. 14A and 14B, diffuse light having the same diffusion angle (40 degrees in FIGS. 14A and 14B) is emitted from the optical fiber 102 in both the width direction (XIVA—XIVA direction) and the length direction (XIVB—XIVB direction).

Further, it is difficult for one set of LEDs $101_1$ to $101_3$ to obtain a sufficient amount of light, and loss in the amount of light is large during input and output of light to and from the optical fibers 4. Therefore, conventionally, for example, an additional three sets of LEDs similar to LEDs $101_1$ to $101_3$ are prepared, and a total of 12 LEDs (=3×4 sets) are used to maintain the intensity of light.

In order to maintain the intensity of light, there is a method using, instead of an LED, for example, a halogen lamp having an intensity higher than that of an LED. However, halogen lamps generally have a drawback that their service life is shorter than that of an LED.

Therefore, conventionally, as an illumination optical system for reproducing two tracks of an S track and a P track in which digital sound is recorded, two sets of optical fibers formed of 12 LEDs and four very small fibers are required, presenting the problem that the apparatus has a higher cost and becomes enlarged.

SUMMARY OF INVENTION

The present invention has been achieved in view of such circumstances and makes it possible to construct the apparatus in a small size and at a low cost. The reproduction apparatus method according to the invention diffuses light from a source into diffuse light, which light is radiated onto a film on which data is recorded in the form of dots. The diffusion angle of the diffuse light is greater along the width direction of the film than along the length direction thereof Therefore, it is possible to obtain diffuse light with a sufficient amount of light, which is not susceptible to the influence of scratches of a film along the length direction.

The foregoing and other objectives, features and advantages of the invention will be more readily understood upon consideration of the following detailed description of certain preferred embodiments of the invention, taken in conjunction with the accompanying drawings.

DESCRIPTION OF PREFERRED EMBODIMENTS

Before the embodiment of the present invention is described below, in order to clarify the corresponding relationship between each means of the invention described in the claims and the following embodiment, one example of the corresponding embodiment is added to the parentheses after each means, and the features of the present invention will now be described.

The reproduction apparatus according to one embodiment of the invention reproduces data recorded in the form of dots on a film, and comprises a light source (for example, an LED 51 shown in FIG. 4) for emitting light to be radiated onto the film; a diffuser (for example, an elliptical diffuser 52 shown in FIG. 4) for diffusing light from the light source into diffuse light; and photoelectric-conversion means (for example, a line sensor 43A shown in FIG. 4) which photoelectrically converts transmitted light or reflected light obtained by radiating the diffuse light onto the film. The diffusion angle of the elliptical diffuser 52 is greater along the width direction of the film than along the length direction thereof. It is a matter of course that this description does not mean that each means is limited to those described above.

Figure 1:
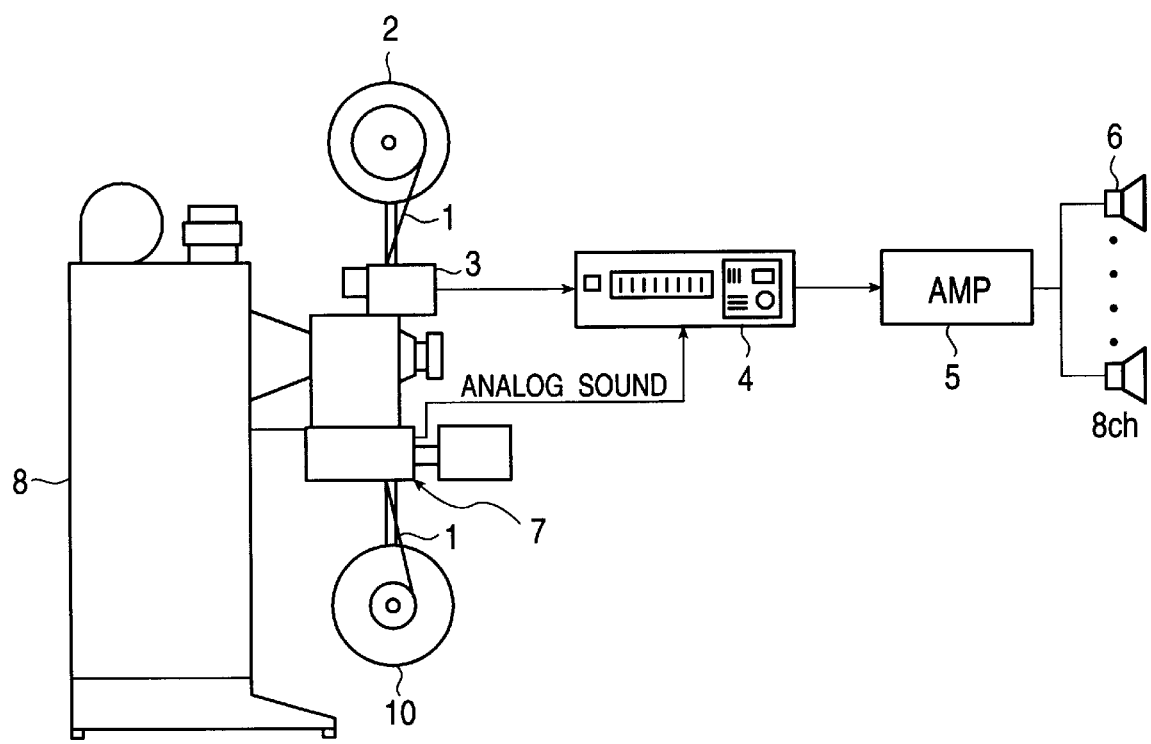
FIG. 1 is a block diagram showing an example of the construction of an embodiment of a projection system of the present invention.

FIG. 1 shows the construction of an embodiment of a projection system (system refers to a logical assembly of a plurality of apparatuses, and it does not matter whether the apparatus of each construction is within the same housing) of the present invention.

Figure 8:
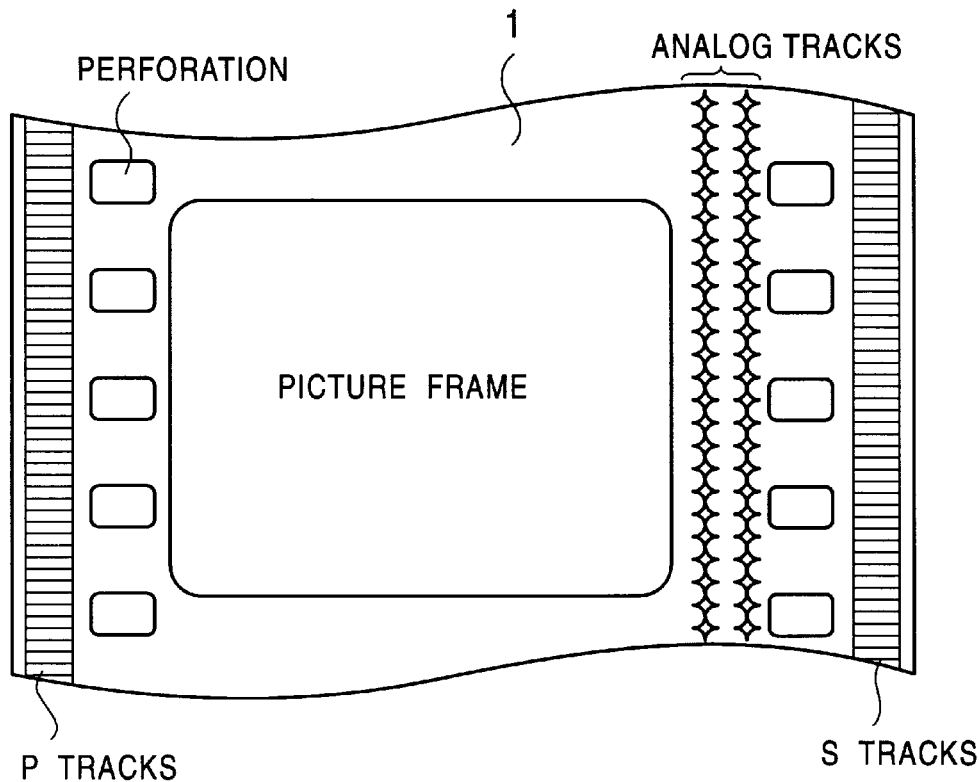
FIG. 8 is a plan view showing an example of the construction of a movie film 1.
Figure 9:
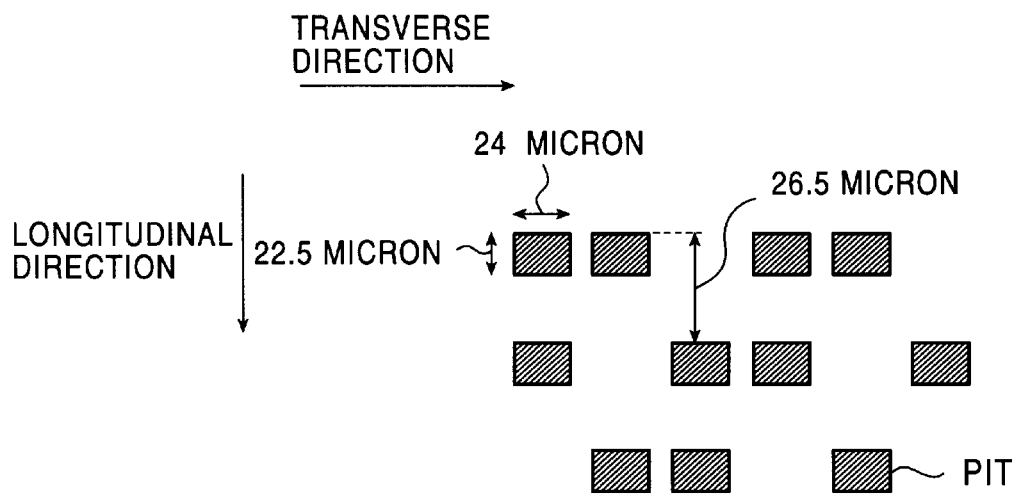
FIG. 9 shows pits formed on the P and S tracks of FIG. 8.
Figure 10:
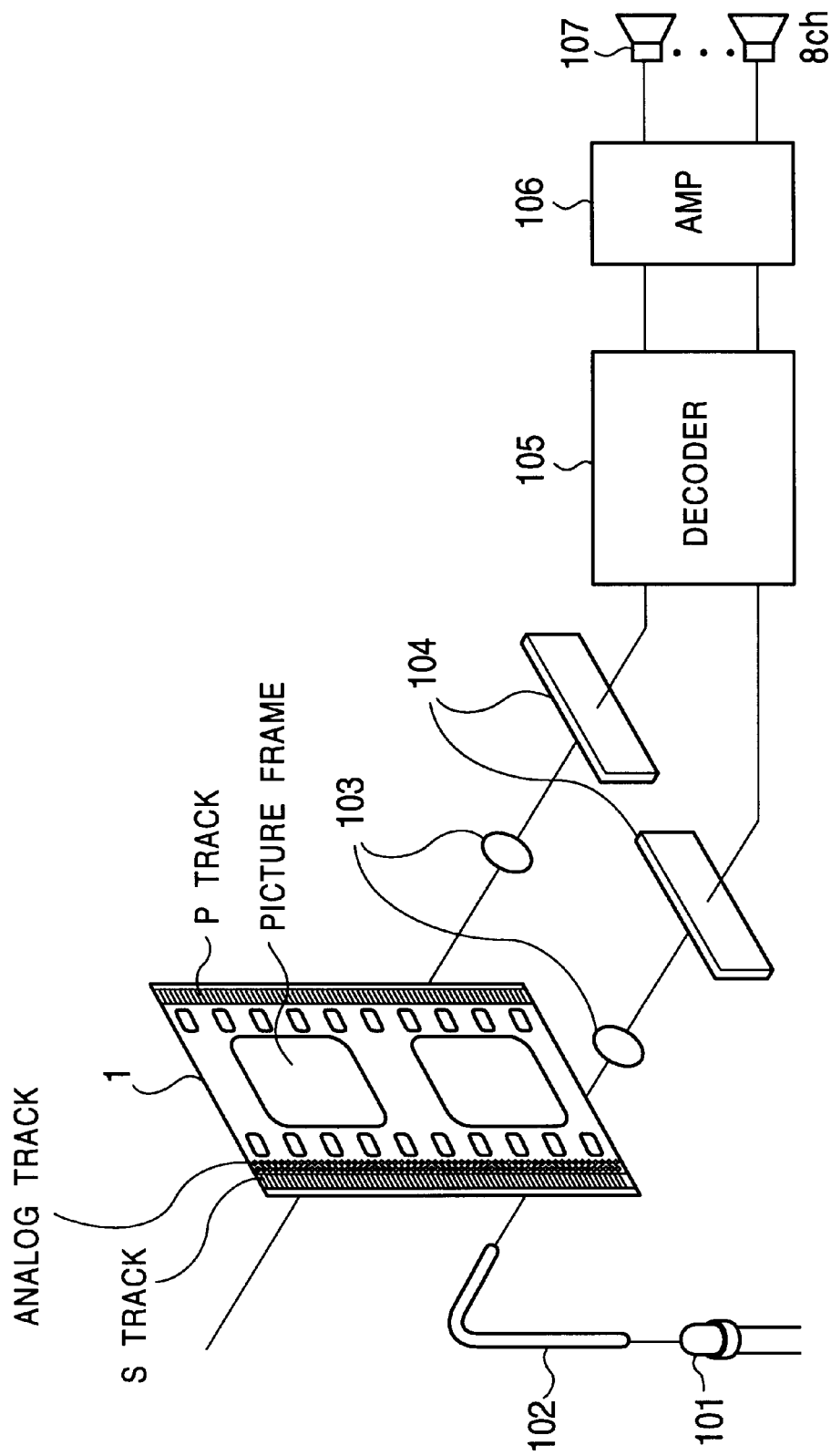
FIG. 10 is a view illustrating the principle for reproducing a movie film of FIG. 8.
Figure 11:
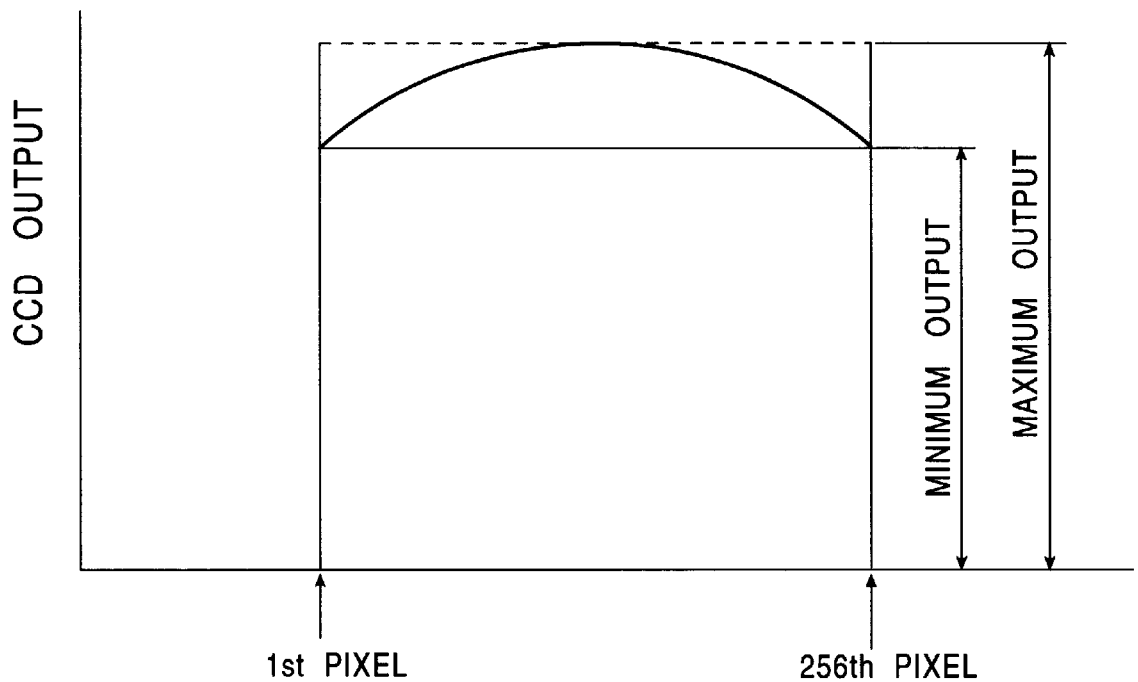
FIG. 11 is a view illustrating the formation of a uniform light-amount distribution.
Figure 12A:
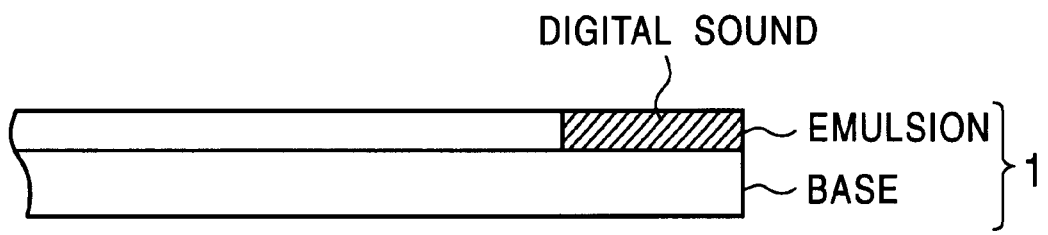
FIGS. 12A and 12B are sectional views showing an example of the construction of the movie film 1.
Figure 12B:
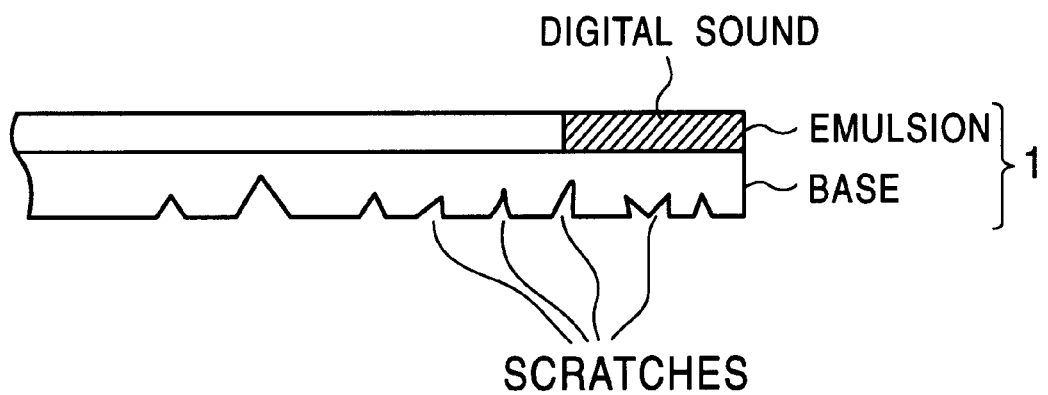

For example, a movie film 1 in which digital sound is recorded by an SDDS method as shown in FIG. 8 is wound around a supply reel 2. The movie film 1 is taken out from the supply reel 2 and inserted into a reader 3. The reader 3 reads pits as digital sound recorded on the movie film 1 and supplies an electrical signal as the result of the reading to a decoder 4. The decoder 4, an amplifier 5, and a speaker 6 correspond to the decoder 105, the amplifier 106, and the speaker 107, respectively, shown in FIG. 10. In the decoder 4, a signal from the reader 3 is decoded into digital sound and output from the speaker 6 via the amplifier 5.

The movie film 1, whose pits are read by the reader 3, is fed to a projector 7, whereby an image recorded on the movie film 1 is projected on a screen (not shown) by light from a light-source section 8. Further, in the projector 7, sound (analog sound) of analog tracks recorded on the movie film 1 is reproduced by light from the light-source section 8 and supplied to the decoder 4. When, for example, an error occurs in digital sound, the decoder 4 causes analog sound as a back-up, instead of the digital sound, to be output from the speaker 6.

The movie film 1, such that the image and analog sound are reproduced, is fed from the projector 7 and supplied to a take-up reel 10. In the take-up reel 10, the movie film 1 from the projector 7 is taken up.

Figure 2:
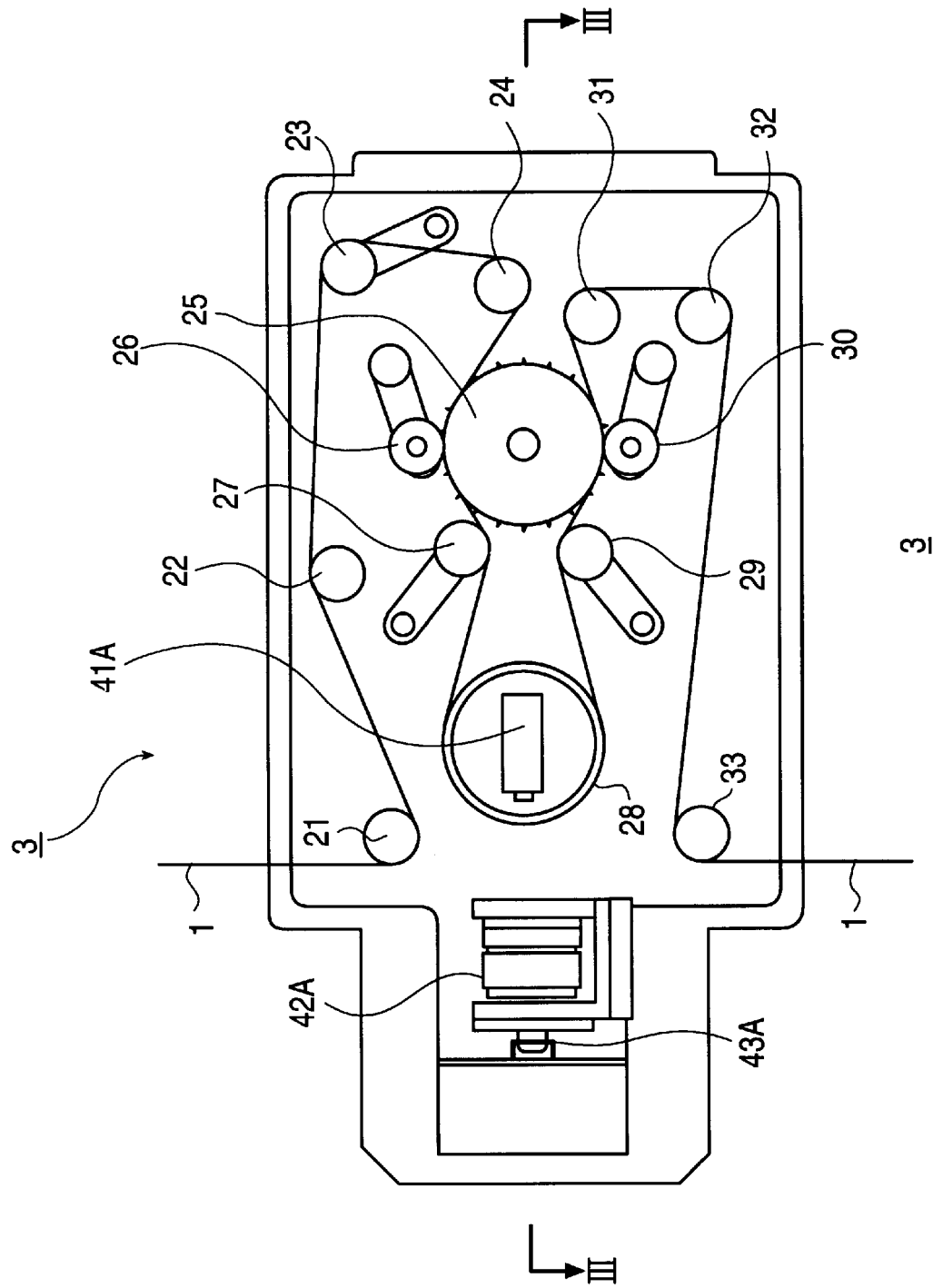
FIG. 2 is a plan view showing an example of the construction of a reader 3 of FIG. 1.
Figure 3:
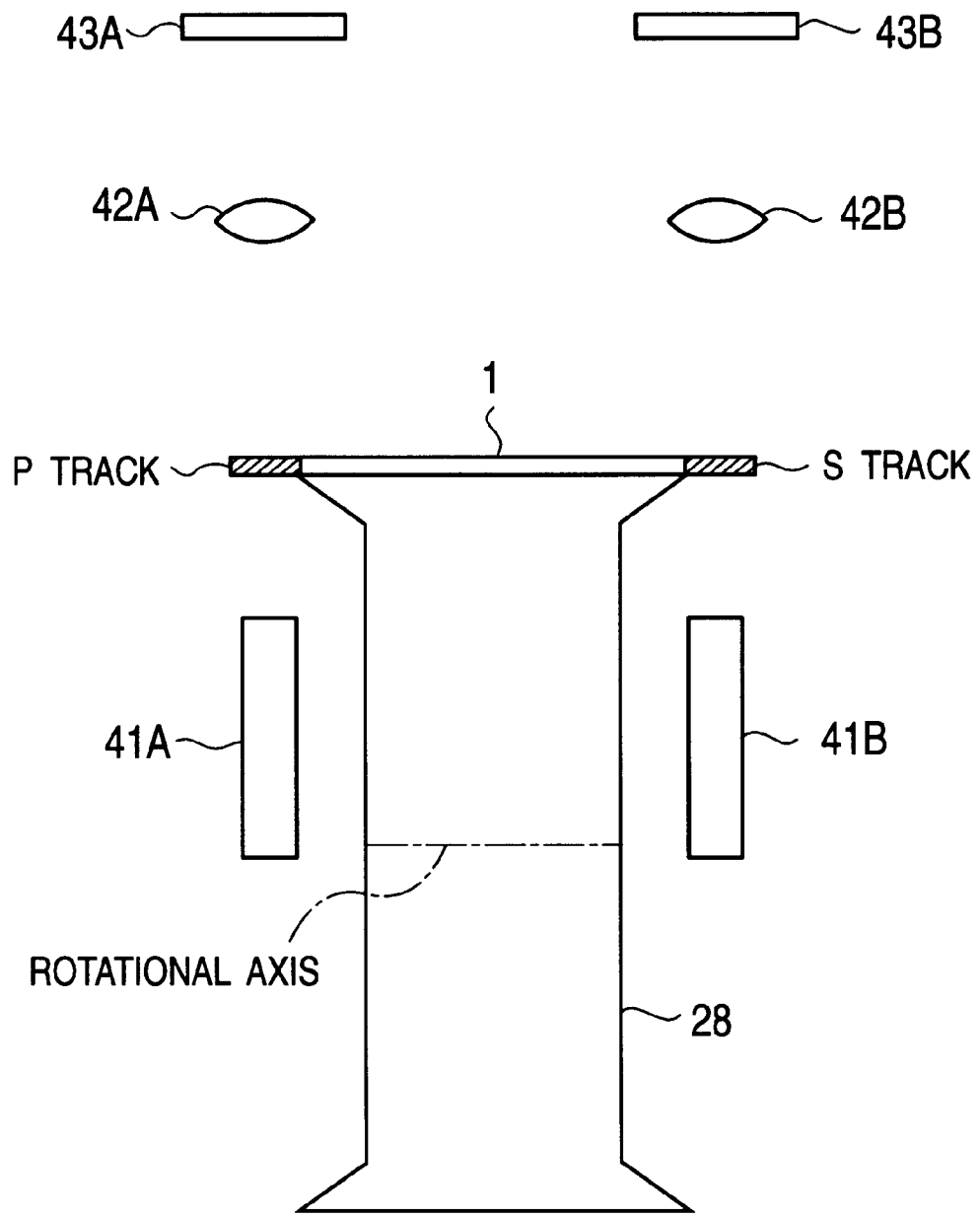
FIG. 3 is a sectional view when the reader 3 of FIG. 2 is viewed from the III—III direction.

Next, FIGS. 2 and 3 show an example of the mechanical construction of the reader 3 of FIG. 1. FIG. 3 is a sectional view of FIG. 2 viewed along the III—III direction. In FIG.

3, an illustration of points other than the movie film 1, a drum 28, light-source sections 41A and 41B, lenses 42A and 42B, and line sensors 43A and 43B is omitted to avoid a complex figure.

The movie film 1 is hooked to a guide roller 21 and guided to a guide roller 23 around a guide roller 22. The guide roller 23 is urged by a spring (not shown) and functions as a stabilizer so as to impart an appropriate tension to the movie film 1. The movie film 1 is folded by about 90 degrees at the guide roller 23 and guided to a sprocket 25 by a guide roller 24.

The perforations of the movie film 1 are hooked to the teeth formed on the periphery (outside surface) of the sprocket 25 and fed thereby. Press rollers 26 and 30 are urged in the direction of the sprocket 25 by, for example, a spring, and press the central portion (the central portion along the width direction) of the movie film 1 to the sprocket 25, causing the movie film 1 to be in close contact with the sprocket 25.

The movie film 1 fed from the sprocket 25 is given an appropriate tension via a guide roller 27 urged by, for example, a spring and is guided to the drum 28. The movie film 1 is folded back by about 180 degrees around the drum 28 and fed to the sprocket 25 via a guide roller 29. Here, the guide roller 29 is urged by, for example, a spring and gives an appropriate tension to the movie film 1.

The movie film 1 fed from the guide roller 29 is engaged with the sprocket 25, is folded back by about 180 degrees around the guide rollers 31 and 32, and fed to the projector 7 via a guide roller 33.

The movie film 1 is caught between the guide rollers 24 and 31 and between the guide rollers 27 and 29, thereby more perforations of the movie film 1 are hooked to more teeth of the sprocket 25. Further, by giving tension to the movie film 1, the movie film 1 is brought into close contact with the drum 28 without slack.

In this embodiment, the feeding of the movie film 1 is performed by the projector 7. Therefore, the reader 3 does not have motive power for feeding the movie film 1. Further, in order to prevent the movie film 1 from being slackened within the reader 3 as a result of being pulled by the projector 7, the sprocket 25 is provided with a brake. That is, by applying to the sprocket 25 a force in a direction opposite to the tension force of the projector 7, the movie film 1 maintains an appropriate tension and does not slacken within the reader 3.

The drum 28 has a cylindrical shape, the central portion of the two bottoms thereof is recessed from the side surface (the periphery of the drum 28), as shown in FIG. 3, with the light-source sections 41A and 41B for reproducing digital sound recorded in the P track or the S track being disposed in the recessed portion. For correct viewing, FIG. 3 should be turned 90° clockwise. The reason why the central portion of the bottom of the drum 28 is recessed is for the purpose of disposing the light-source sections 41A and 41B. In contrast, the reason why the side surface is projected more than the central portion is for the purpose of preventing the end portions along the width direction of the movie film 1 wound around the drum 28 from being slackened in the direction of the rotational axis of the drum 28. The width (the height of the side surface) of the periphery of the movie film 1 is, at most, of a length such that the P and S tracks of the movie film 1 stick out from the drum 28.

The light-source sections 41A and 41B radiate light onto the P track and the S track, respectively, which stick out from the drum 28. This light passes through the P track and the S track and is converged onto the line sensors 43A and 43B, such as a line CCD, through the lens 42A and 42B, respectively. In the line sensors 43A and 43B, the transmitted light from the P track and the S track, respectively, is photoelectrically converted, and the resulting electrical signals are supplied to the decoder 4.

Figure 4:
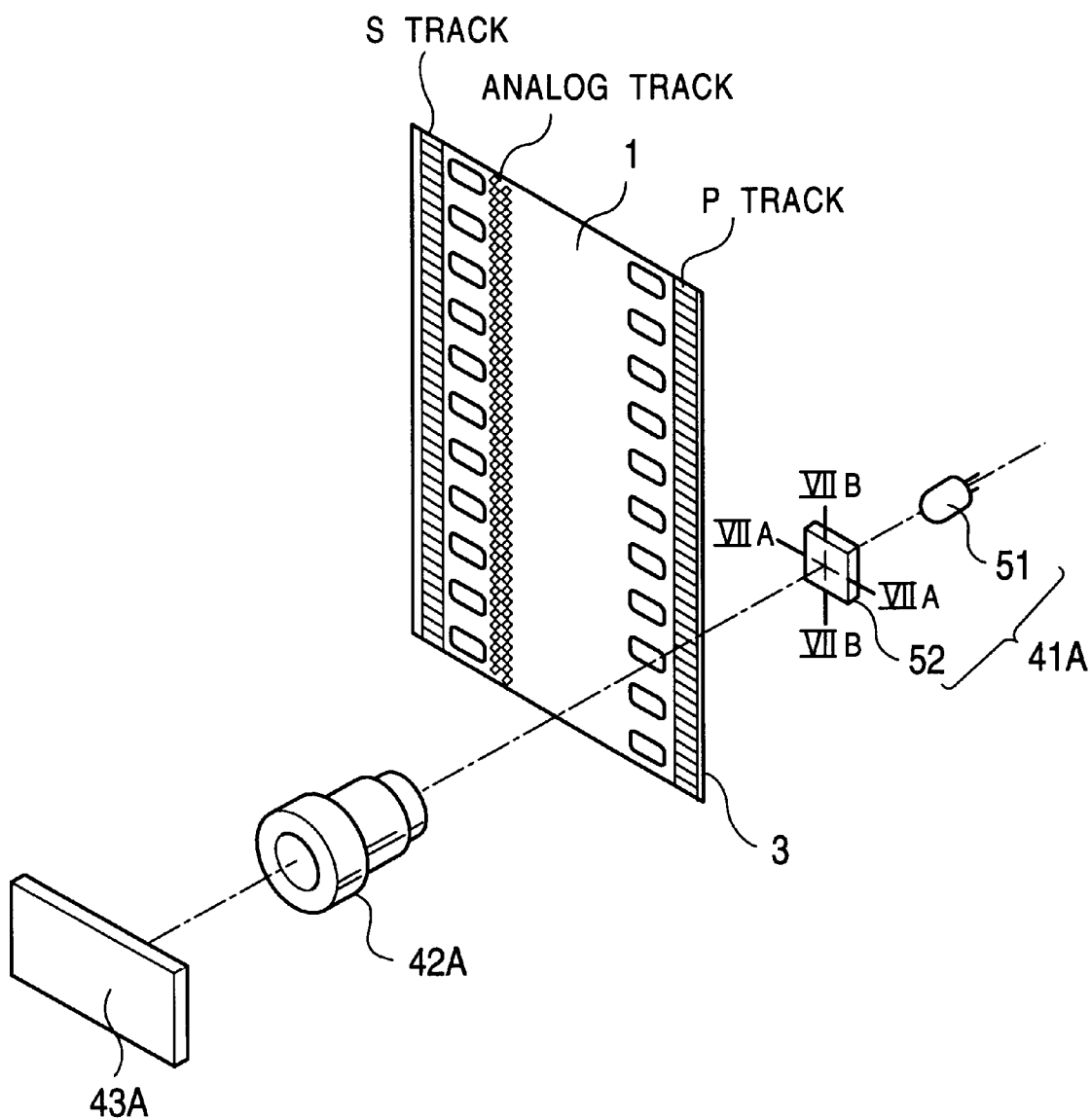
FIG. 4 is a perspective view showing an example of the construction of a light-source section 41A of FIG. 2.
Figure 5:
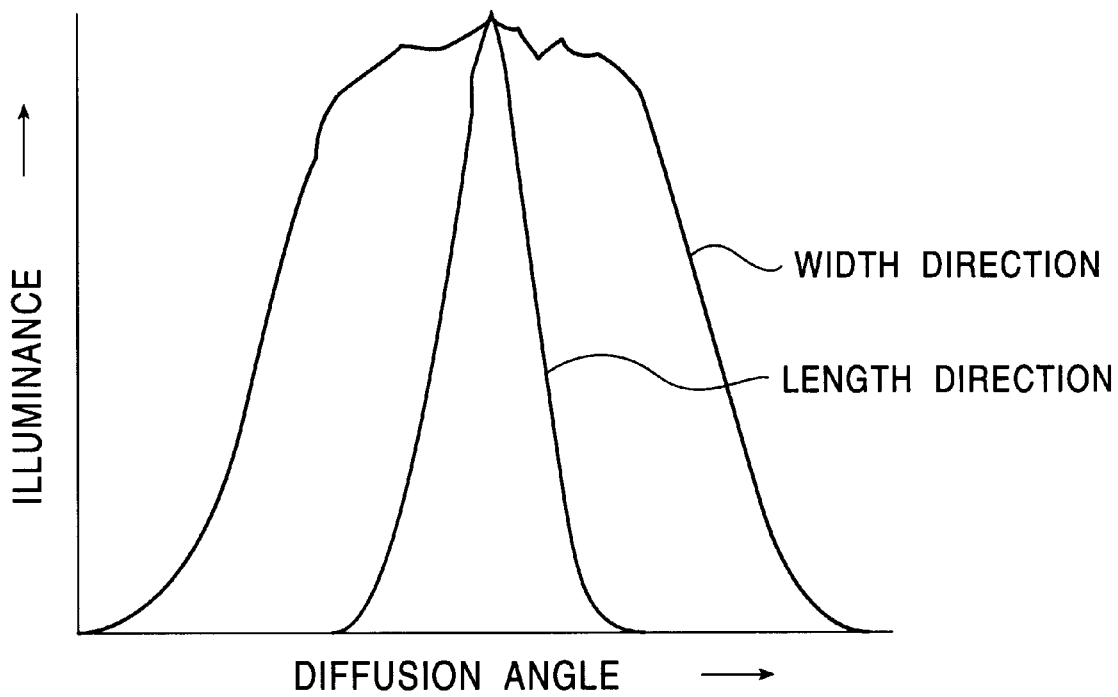
FIG. 5 is a view showing the characteristics of a diffuser 52 of FIG. 4.

The perspective view of FIG. 4 shows an example of the construction of the light-source section 41A of FIG. 3. Since the light-source section 41B is constructed the same as the light-source section 41A, a description thereof has been omitted (an illustration thereof has also been omitted).

The light-source section 41A comprises a light source, for example, the LED 51, which emits light to be radiated onto a pit sequence (pit sequence along the width direction) as digital sound formed on the P track, and a diffuser 52 for diffusing the light into diffuse light and radiating it onto the P track.

The diffuser 52 is, for example, an elliptical diffuser for forming the light from the LED 51 into diffuse light, the diffusion angle of which is greater along the width direction of the movie film 1 than along the length direction thereof. Thus, the light to be radiated onto the P track is formed into diffuse light so that a reading error of pits, caused by scratches formed along the length direction on the movie film 1, can be prevented (reduced) and such that the amount of light is sufficient and uniform (the minimum output/maximum output of the line sensor 43A is made to exceed a predetermined standard value).

Figures 6A, 6B:
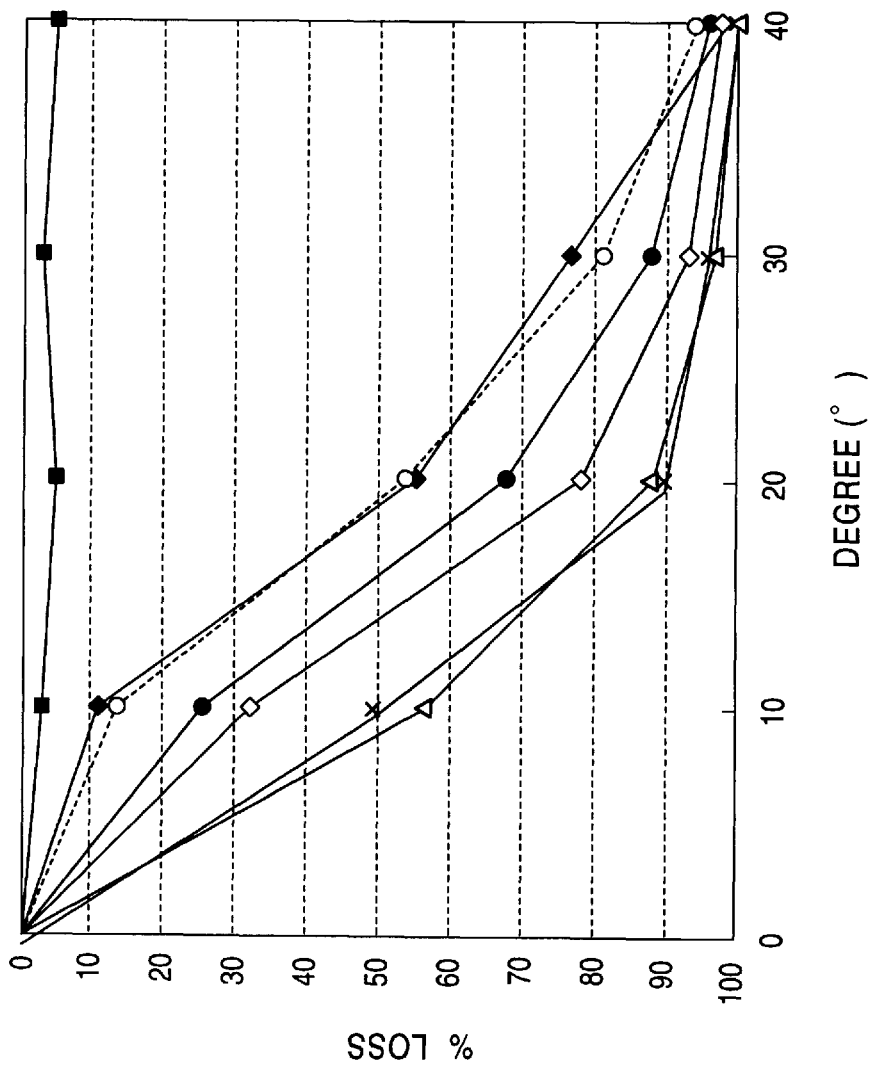
FIGS. 6A and 6B are views showing the characteristics of various diffusers.

FIG. 6A shows the results of the investigation of the diffusion angle of various diffusers and the amount of light, conducted by the inventors of the present invention. FIG. 6A shows the relationship between the diffusion angle, and the light-amount loss in the direction of the diffusion angle with respect to the light in the direction of 0 degree (in the direction of the optical axis). Further, in FIG. 6B, the numerals represented in percent within the parentheses ( ) show the amount of the diffuse light obtained by each diffuser with, for example, the amount of light used in a reader (model No: DFP-R2000) manufactured by Sony Corporation as a reference (100%).

Figure 13:
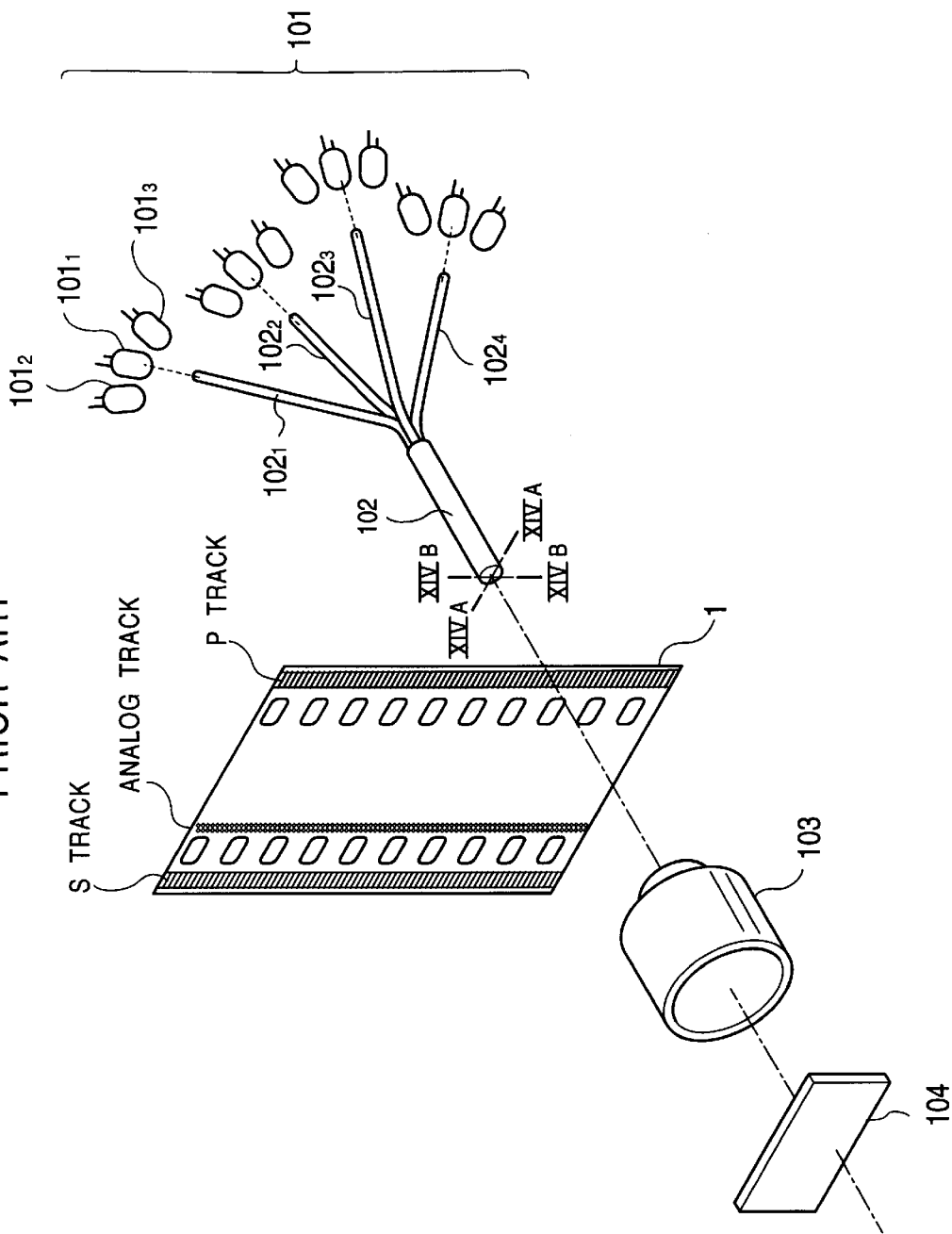
FIG. 13 is a perspective view showing an example of the construction of a conventional illumination optical system of a reproduction apparatus which reproduces digital sound recorded on the movie film 1.
Figure 14A:
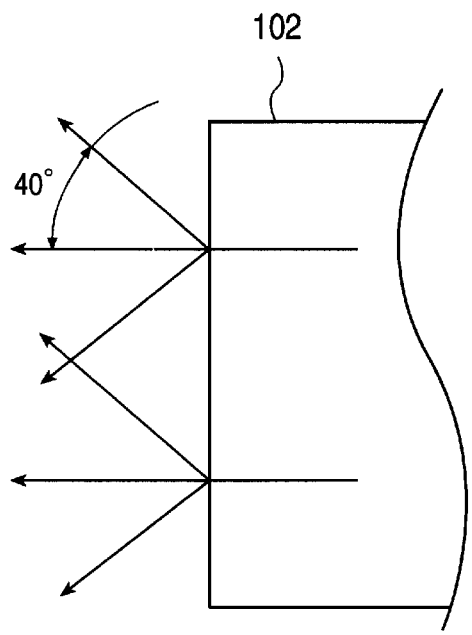
FIGS. 14A and 14B are views illustrating diffuse light emitted from an optical fiber 102 of FIG. 13.
Figure 14B:
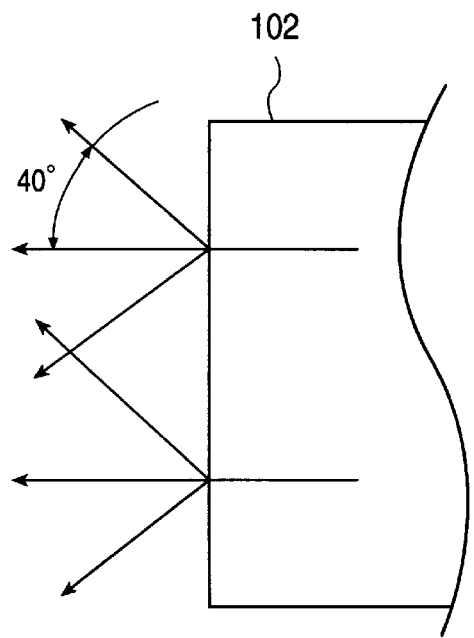

Here, in the reader DFP-R2000 manufactured by Sony Corporation, as described in FIG. 13, to read one track (S track or P track), an optical fiber formed of four very small fibers and 12 LEDs is used.

When the degree of diffusion (diffusion angle) is taken note of, it can be seen from FIG. 6A that a holographic diffuser 40 has characteristics which most resemble those of the light adopted in the reader DFP-R2000. In this case, however, as shown in FIG. 6B, the amount of light is 53%, and it is difficult to obtain a sufficient amount of light. On the other hand, when the amount of light is taken note of, it can be seen from FIG. 6B that the use of a holographic diffuser 20 makes it possible to obtain an amount of light equal to the light adopted in the reader DFP-R2000. In this case, however, as shown in FIG. 6A, the diffusion angle is decreased (becomes almost half of that in the case of the reader DFP-R2000).

As described above, in each of the diffusers shown in FIG. 6B, one of the degree of diffusion and the amount of light (the amount of light in the case of direct illumination by a single LED) is not sufficient.

Accordingly, as the diffuser 52, here, an elliptical diffuser is adopted which has a sufficient degree of diffusion, for example, characteristics comparable to those of a holographic diffuser 60, along the width direction of the movie film 1, though the amount of light is insufficient, and which has a sufficient amount of light, for example, characteristics comparable to those of a holographic diffuser 10, along the length direction, though the degree of diffusion is insufficient.

Figure 7A:
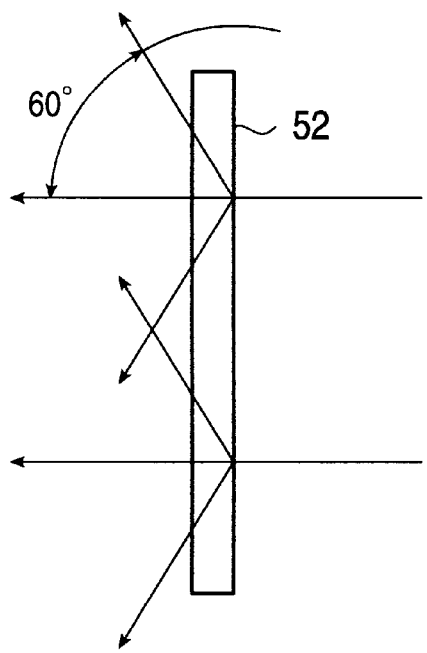
FIGS. 7A, 7B, and 7C are views illustrating diffuse light formed by the diffuser 52.
Figure 7B:
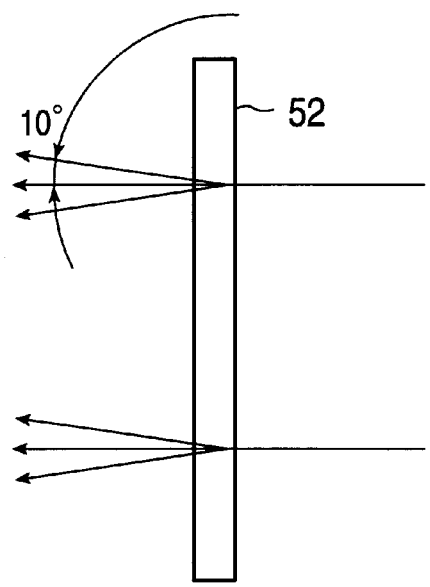
Figure 7C:
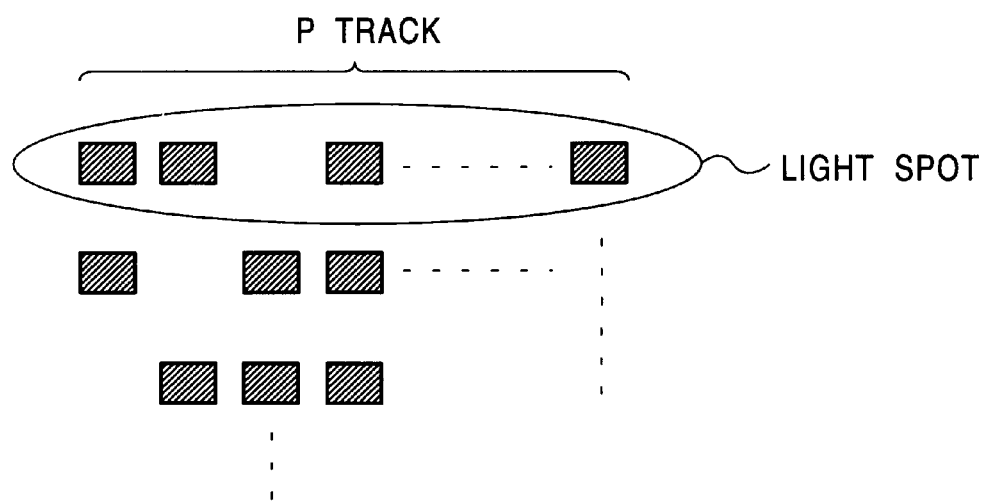

As a result, in the diffuser 52, for example, as shown in FIGS. 7A and 7B, diffuse light having a diffusion angle up to about 60 degrees is emitted along the width direction (the VIIA—VIIA direction in FIG. 4), and diffuse light having a diffusion angle up to about 10 degrees is emitted along the length direction (the VIIB—VIIB direction in FIG. 4). As a result, an elliptical light spot extended along the width direction, such as that shown in FIG. 7C, is formed in the P track.

In this case, the degree of diffusion along the length direction is smaller than that of the conventional case (for example, light adopted in the reader DFP-R2000). However, since most of scratches formed in the movie film 1 are along the length direction, the small degree of diffusion along the length direction hardly exerts an influence upon the reading error of pits resulting from such scratches. That is, by causing the degree of diffusion along the width direction to be greater than or equal to that of the conventional case, the reading error of pits resulting from scratches along the length direction can be prevented (reduced).

On the other hand, a decrease in the amount of light caused by causing the degree of diffusion along the width direction to be greater than or equal to that of the conventional case can be compensated for by decreasing the degree of diffusion along the length direction.

The amount of light is made uniform by causing the variation in the amount of light from the LED 51 to be uniform by the diffuser 52.

From the above, it is possible to obtain diffuse light, whose amount of light is sufficient and which is made uniform and has a sufficient degree of diffusion by one LED 51.

Therefore, since the light-source section 41A as an illumination optical system may be formed of one LED 51 and one diffuser 52, the apparatus can be constructed in a small size and at a low cost. Specifically, the number of required LEDs can be one twelfth the case in FIG. 13. Also, in FIG. 13, the volume of the portion occupied by twelve LEDs 101 and the optical fiber 102 can be about one tenth by forming the portion of the LED 51 and the diffuser 52.

Further, since the degree of diffusion along the width direction can be made greater than or equal to that of the conventional case in a range in which a decrease in the amount of light can be compensated for by decreasing the degree of diffusion along the length direction, it becomes possible to further improve the tolerance to scratches along the length direction. As a result, it becomes possible to increase the limit of the number of times the movie film can be used.

Although in this embodiment an elliptical diffuser is used to diffuse light more strongly along the width direction of the movie film than along the length direction, other means may be used to achieve the same effect.

Although in this embodiment data in the form of dots as digital sound recorded on a movie film is reproduced by light diffused by the elliptical diffuser, in addition to this case, it is also possible to reproduce an image and analog sound recorded on the movie film.

Although in this embodiment a movie film on which digital sound is recorded by an SDDS method is targeted, the present invention may be applied to a case in which digital sound recorded by other methods is reproduced. That is, as a technique for recording digital sound on a movie film, for example, there is an SR-D method of the Dolby Co., Ltd. for recording digital sound between perforations, and the present invention may be applied to such a method.

Although in this embodiment data in the form of dots as digital sound is reproduced, the present invention may be applied to a case in which, for example, subtitles and other information other than digital sound are recorded as data in the form of dots.

There is a case in which, for example, digital sound is recorded on a CD and a time code for obtaining synchronization with the digital sound is recorded on a movie film (a digital film sound system of the DTS Co., Ltd.). The present invention may be applied to a case in which such a time code recorded on a movie film is reproduced.

Although in this embodiment a movie film is targeted, the present invention may be applied to any apparatus which reproduces information from a film on which information is recorded, other than a movie film.

Although in this embodiment transmitted light which passes through a movie film is photoelectrically converted, in addition, the present invention may also be applied to a case in which light reflected by a movie film is photoelectrically converted.

Although in this embodiment an LED is used as a light source for radiating light onto a movie film, the light source is not limited to an LED.

According to the reproduction apparatus and method of the invention, light to be radiated onto a film on which data is recorded in the form of dots is diffused by a diffuser into diffuse light, the diffusion angle of which is greater along the width direction of the film than along the length direction thereof. Therefore, it is possible to achieve a small size and a low cost of the apparatus. It is also possible to obtain diffuse light with a sufficient amount of light, which is not susceptible to the influence of scratches of a film along the length direction.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A reproduction apparatus for reproducing data recorded in the form of dots on a film, the reproduction apparatus comprising:

a light source for emitting light;

a diffuser interposed between the light source and the film for diffusing light from the light source into diffuse light which is radiated onto the dots on the film with the diffusion angle of the diffuse light being greater along the width direction of the film than along the length direction thereof; and photoelectric detector which photoelectrically converts the diffuse light which is modulated by the dots on the film into an electrical signal.

2. A reproduction apparatus according to claim 1, wherein the diffuser is an elliptical diffuser.

3. A reproduction apparatus according to claim 1, wherein the diffuser has a diffusion angle of about 60° along the width direction of the film and about 10° along the length direction thereof.

4. A reproduction apparatus according to claim 1, wherein the photoelectric detector detects modulated diffuse light passing through the film.

5. A reproduction apparatus according to claim 1, wherein the photoelectric detector detects modulated diffuse light reflected by the film.

6. A reproduction apparatus according to claim 1, wherein the dots represent one or more digital sound tracks on the film and the electrical signal is representative of one or more sound signals.

7. A reproduction apparatus according to claim 1, wherein the dots are arranged in sequences of lines along the width direction of the film.

8. A reproduction apparatus according to claim 1, wherein the dots are arranged on the film between a line of sprocket holes extending along the length of the film and an edge of the film which is closest to the line of sprocket holes.

9. A reproduction apparatus according to claim 1, wherein the light source is at least one light emitting diode.

10. A reproduction method for reproducing data recorded in the form of dots on a film, the reproduction method comprising the steps of:

emitting light;

diffusing the emitted light into diffuse light to be radiated onto the film, wherein the diffusion angle of the diffuse light is greater along the width direction of the film than along the length direction thereof; and photoelectrically converting the diffuse light which is modulated by the dots on the film into an electrical signal.

11. A reproduction method according to claim 10, wherein the diffusing step includes the step of diffusing light with an elliptical diffuser.

12. A reproduction method according to claim 10, wherein the diffusing step diffuses at an angle of about 60° along the width direction of the film and about 10° along the length direction thereof.

13. A reproduction method according to claim 10, wherein the photoelectric converting step converts modulated diffuse light passing through the film into an electrical signal.

14. A reproduction method according to claim 10, wherein the photoelectric converting step converts modulated diffuse light reflected by the film into an electrical signal.

15. A reproduction method according to claim 10, wherein the dots represent one or more digital sound tracks on the film and the electrical signal is representative of one or more sound signals.

16. A reproduction apparatus according to claim 10, wherein the step of emitting light comprises emitting light from at least one light emitting diode.

* * * * *